Jan. 11, 1949. E. PICK Re. 23,076

PLURAL VALVE ACTUATION AND CONTROL

Original Filed Oct. 15, 1935 9 Sheets-Sheet 1

Inventor
Eric Pick,

K. P. McElroy
Attorney

PLURAL VALVE ACTUATION AND CONTROL

Original Filed Oct. 15, 1935 9 Sheets-Sheet 2

Inventor

Eric Pick,

By K. P. McElroy

Attorney

Jan. 11, 1949. E. PICK Re. 23,076

PLURAL VALVE ACTUATION AND CONTROL

Original Filed Oct. 15, 1935 9 Sheets-Sheet 3

Inventor
Eric Pick,

K. P. McElroy
Attorney

Jan. 11, 1949. E. PICK Re. 23,076

PLURAL VALVE ACTUATION AND CONTROL

Original Filed Oct. 15, 1935 9 Sheets-Sheet 4

Inventor

Eric Pick,

By K. P. McElroy

Attorney

Jan. 11, 1949. E. PICK Re. 23,076

PLURAL VALVE ACTUATION AND CONTROL

Original Filed Oct. 15, 1935 9 Sheets-Sheet 5

FILTERING

BACKWASHING

FILTERING TO WASTE

Inventor
Eric Pick,

By K. P. McElroy
Attorney

PLURAL VALVE ACTUATION AND CONTROL

Original Filed Oct. 15, 1935 9 Sheets-Sheet 6

Inventor

Eric Pick,

By K. P. McElroy

Attorney

Jan. 11, 1949. E. PICK Re. 23,076

PLURAL VALVE ACTUATION AND CONTROL

Original Filed Oct. 15, 1935 9 Sheets-Sheet 7

Inventor
Eric Pick,
By K. P. McElroy
Attorney

PLURAL VALVE ACTUATION AND CONTROL

Original Filed Oct. 15, 1935 9 Sheets-Sheet 8

Inventor

Eric Pick,

By K. P. McElroy

Attorney

PLURAL VALVE ACTUATION AND CONTROL

Original Filed Oct. 15, 1935 9 Sheets-Sheet 9

Inventor
Eric Pick,

By K. P. McElroy
Attorney

Reissued Jan. 11, 1949

Re. 23,076

UNITED STATES PATENT OFFICE 23,076

PLURAL VALVE ACTUATION AND CONTROL

Eric Pick, East Rockaway, N. Y., assignor to The Permutit Company, New York, N. Y., a corporation of Delaware Original No. 2,076,321, dated April 6, 1937, Serial No. 45,133, October 15, 1935. Application for reissue September 20, 1945, Serial No. 617,657

4 Claims. (Cl. 137—144)

This invention relates to plural valve actuation and control; and it comprises a valve system for water treatment and for coordination of fluid control generally wherein a plurality of valves controlling several different fluid flows are actuated by individual cylinder-pistons energized by action of a common rotary multiway pilot valve having a pressure fluid inlet, a waste outlet and a plurality of pairs of ports connected respectively to both ends of the several cylinders with a rotatable valve member adapted upon rotation to connect either one of each pair of ports to the pressure fluid inlet and the other port of each pair to the waste outlet, the rotatable member of the multiway pilot valve being readily and advantageously rotated by an electric motor with automatic control by electrical means of the individual valve operations in a cycle of timed sequence; all as more fully hereinafter set forth and as claimed.

In the large scale purification of water supplies such as in municipal water softeners and filters where the control of relatively large flows of water and of treating fluids is required, manual operation of plural valves of large size becomes impracticable and resort is had to power valves of various types. In adapting the zeolite water softening process, for example, to large scale operation, coordination of the operation of a plurality of large sized heavy valves by power means introduces new problems. The use of a central multiway valve with large sized pipe connections may be exceedingly inconvenient if not impracticable. In the present invention I have succeeded in simplifying the synchronous operation of plural valves and in making actuation and control of heavy valves automatic and foolproof. The controlled coordination of large plural valves becomes as simple as that of the relatively small valves in prior water softeners and filters. The system of valve coordination here disclosed in water treating apparatus is applicable to fluid flows of various kinds, such for example as the control of the air, steam, and gas flows in water gas generator sets.

I have found that the operation of as many as seven large valves directing the flows for five separate operations in large scale water softening can be coordinated and controlled by a system of heavy valves actuated by fluid pressure under control of a single rotary multiway pilot valve operating the several heavy valves in a predetermined sequence through connections made by the pilot valve with a common pressure line and a common waste line. Five different operations such as upflow softening, brining, rinsing downwardly and upwardly, and draining, are effected by turning the rotary multiway valve to five different positions corresponding to the several operations. To accomplish this, each of the individual heavy valves is actuated by a pressure cylinder and piston provided with two connections to the rotary multiway pilot valve, these two connections being made at both ends of the cylinder and on opposite sides of the piston, so that the valve may be either opened or closed by actuation of the piston in the cylinder in either direction.

In the individual pressure valve actuation, the piston is energized to open or close the valve by a flow of fluid under pressure from a pressure line through the common pilot valve with a discharge of waste fluid from the cylinder through the pilot valve to a common waste line. Each cylinder has a pair of pipes, designated the bottom and top pipe, running to the pilot valve, and the pilot valve is provided with a plurality of ports in pairs, one of each pair of ports being connected with the bottom pipe of one of the pressure valve cylinders and the other to the top pipe of the same cylinder.

In a multiway pilot valve of the rotary disc type, all of the bottom ports of the pilot valve are located in the pilot valve body at points substantially equidistant from the center of the valve, that is, at substantially the same radial distance. All of the top ports of the pilot valve are located at points also substantially equidistant from the center and at a different radial distance from that of the bottom ports. The common pressure fluid line is connected into the pilot valve casing and the waste line enters the valve body substantially at the center and, therefore, at substantially the same distance from all of the bottom ports and at another substantially equal distance from all of the top ports. Advantageously, a port plate is provided in the pilot valve having a port communicating with the waste line at the center and having ports corresponding to the bottom and top connection ports. The valve has a rotatable member or rotor with a face seated upon the face of the port plate and provided with a recess, an arcuate opening running through the rotor and a cavity or channel arranged to communicate with the waste port in the port plate and running around the rotor face. The rotor is pressed against the port plate by a spring held between the rotor and the valve casing and the fluid pressure line delivers into the valve casing so as to be in open communication with the recess and with the opening of the rotor. Rotation of the rotor effects communication between the pressure line and all of the bottom ports, making connections to open the various pressure valves, with connections made between the top ports and the waste line. In the rotation of the pilot valve rotor also all of the top ports are in turn connected with the pressure line to close the individual pressure valves in predetermined positions of the pilot valve rotor, with the bottom ports put into communication with the waste line.

When the rotary multiway pilot valve is of the rotary plug type, the valve ports for the bottom connections to the individual pressure cylinders are located on one stage or plane around the pilot valve and the top cylinder connecting ports on another plane around the pilot valve The rotary plug is then formed with two separate passage systems adapted to connect both top and bottom ports to either a fluid pressure line or to a waste line, the pressure line entering the pilot valve casing at one end of the plug and the waste line at the other end. The valve ports and the plug passages are so arranged that rotation of the plug to different angular positions effects opening and closing of the individual pressure valves in a desired sequence.

Thus, in different positions of the pilot valve, whether by a rotary disc or a rotary plug movement, all the piston valves are either opened or closed. The several piston valve operations are coordinated in the location of the various top and bottom ports of the pilot valve as will be hereinafter explained.

In a single complete rotation of the pilot valve rotor the various positions of the valve effect coordinated operation of the several fluid control valves and these various coordinated valve operations are readily timed and made automatic by motor operation of the pilot valve stem with electrical control means.

Manual operation and control of heavy valves is simplified by means of a relatively light pilot valve and automatic operation and control of the pilot valve gives indirect but complete control of the heavy valves.

The pilot valve system for control of the cylinder-piston valve actuation as described is adapted to use any suitable fluid under pressure as the energizing medium. Water under the usual supply pressure is a satisfactory fluid. Various oils placed under pressure by a circulating pump may be used with advantage by reason of their lubricating properties. Compressed air is also satisfactory, in which case no collection of the waste fluid discharged by the pilot valve is required.

In Staegemann U. S. Patent No. 2,051,155 water softeners are automatically controlled by a rotary multiport valve directing the various flows for softening and regeneration in cooperation with an electric motor operating the valve, with a rotary circuit breaker actuated by the valve movements and with a timing switch and motor, the circuit breaker and timing switch controlling the valve operating motor circuit through the medium of a magnetic switch in said motor circuit. In the present invention automatic operation and control is extended to water softeners of great capacity. This is done simply by means of operative connections between the pilot valve and the circuit breaker and the valve operating motor.

In the accompanying drawings are shown, more or less diagrammatically, water softener and filter valve systems within my invention. In this showing, Fig. 1 is a view in elevation with parts in section of a downflow gravity water softener with a pilot valve control system;

Fig. 2 is a section through the pilot valve of the softener of Fig. 1;

Fig. 3 is a section along the line 3—3 of Fig. 2, Fig. 2 being a section on the line 2—2 of Fig. 3, Figs. 2 and 3 showing the pilot valve with the rotor in softening position;

Figure 22:
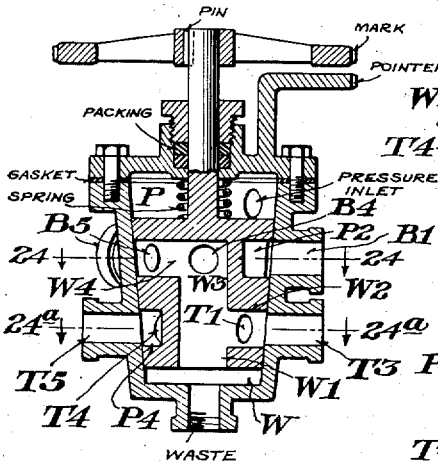
Fig. 22 is a vertical section through a rotary plug pilot valve suitable for the softener of Fig. 21, the section being along the line 22—22 as shown in Figs. 24 and 24*a*.
Figure 23:
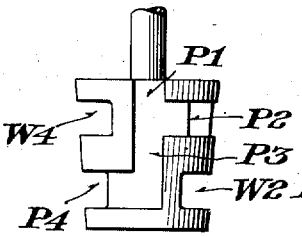
Fig. 23 is an elevational outline of a portion of the rotary plug in the valve shown in Fig. 22.
Figure 24A:
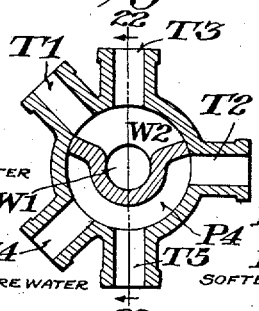
Fig. 24 is a horizontal section along the line 24—24 of Fig. 22 with the valve in softening position.
Figure 24:
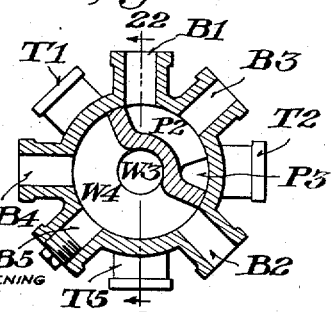
Figure 25A:
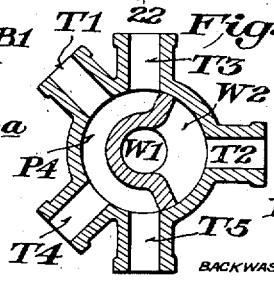
Figure 25:
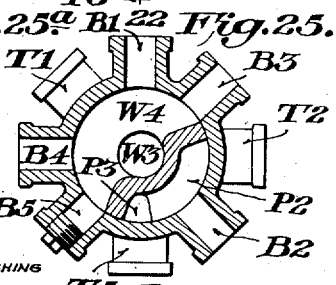
Figure 26A:
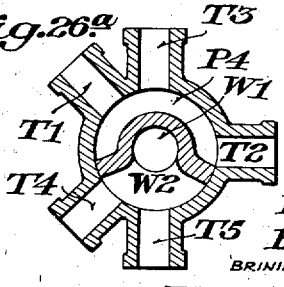
Figure 26:
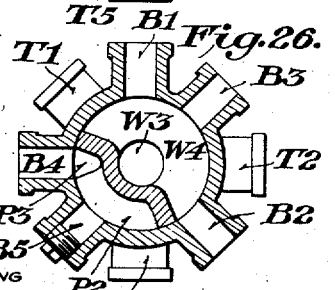
Figure 27A:
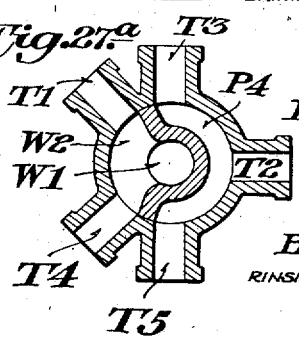
Figure 27:
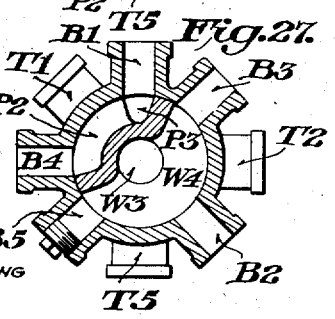
Figure 28:
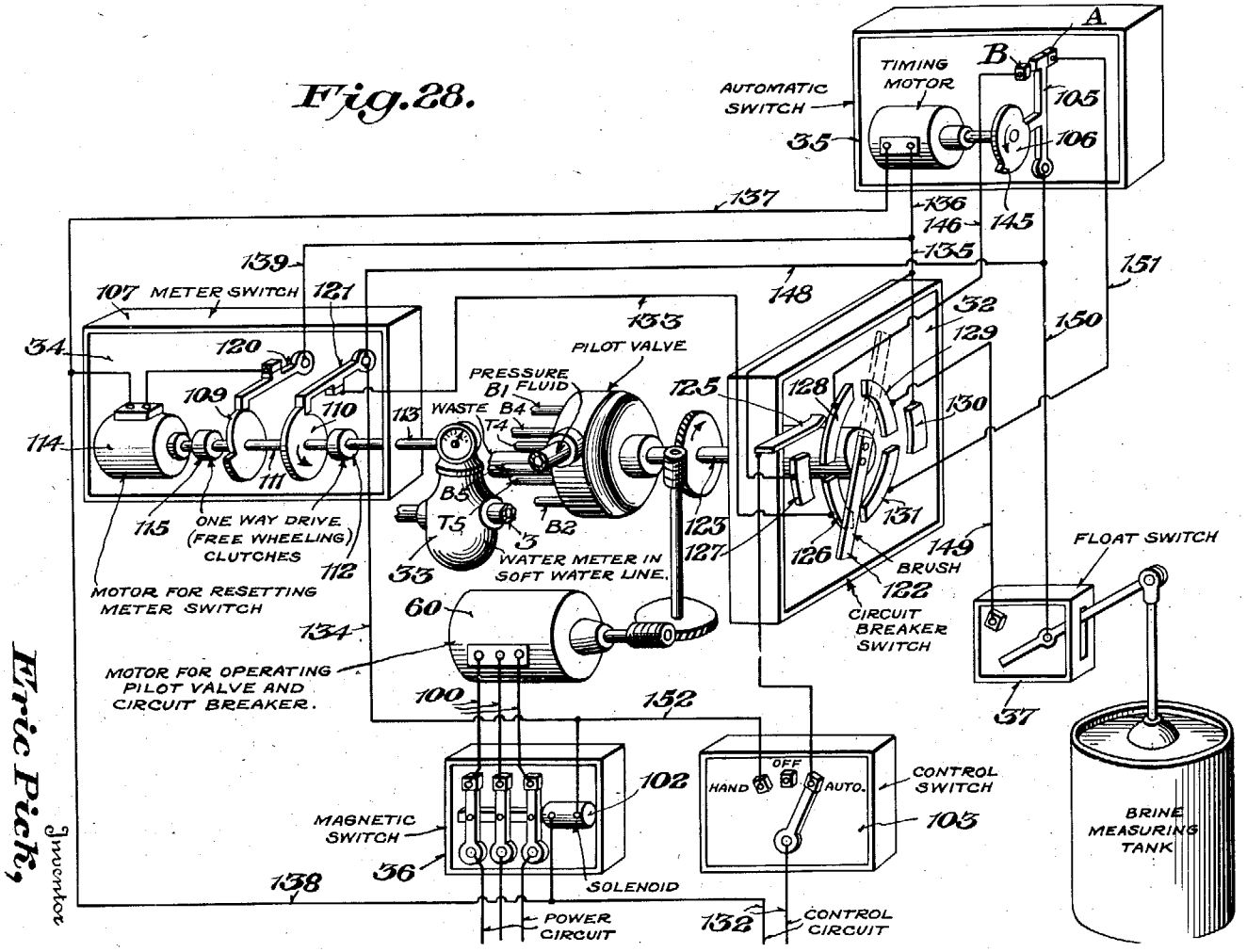

Fig. 24*a* is a horizontal section along the line 24*a*—24*a* of Fig. 22 with the valve in softening position;

Figs. 25, 26 and 27 are horizontal sections similar to Fig. 24 with the valve in backwashing, brining and rinsing positions, respectively;

Figs. 25*a*, 26*a* and 27*a* are sections similar to Fig. 24*a* with the valve in backwashing, brining and rinsing positions as in Figs. 24, 25, 26; and Fig. 28 reproduces features of one of the figures of the acknowledged Staegemann patent with certain modifications showing a diagram of electrical means adapting the Staegemann invention for use in automatic control of a pilot valve in regenerating a large scale water softener.

In the valve system for a downflow gravity softener as shown in Figs. 1 to 7, the flow of raw or hard water to the top of the softening tank is controlled by a hydraulic piston valve V1 in the line 1 delivering into a trough running around the top portion of the softening tank above the zeolite bed. The flow of hard water from the line 1 to the bottom of the softening tank is controlled by a valve V2 in the line 2 running to the bottom of the softening tank and terminating in a distributor D placed in a bed of gravel underlying the zeolite bed. The flow of water from the top of the softening tank to waste is controlled by a valve V2A, this valve being in a waste line 2A running from the trough at the top of the softening tank. As shown, line 2A branches from line 1. The flow of softened water to service or to storage from the bottom of the softening tank is controlled by a valve V3 in the service line 3 connected, as shown, with the bottom line 2. The flow of water from the bottom of the softening tank to waste is controlled by a valve V4 in a waste line 4 running, as shown, from the bottom line 2. A water line 5 running from the raw water line 1 carries water to a brine injector which sucks brine from a brine tank and a flow of brine from the injector to the top of the softening tank is passed through a brine line 6 delivering through a brine distributor, as shown, line 6 being provided with a check valve to prevent flow of water from the softener into the brine tank. The flow of pressure water to the brine injector through line 5 is controlled by a valve V5.

The hydraulic cylinders and pistons operating the six V valves are of the same construction as that of valve V3, shown in section. The valve is of the gate valve type with its stem operated by the piston E in the cylinder F. The hydraulic cylinders each have a connecting line T at the top or outer end of the cylinder and a connecting line B at the bottom or inner end of the cylinder and the arrangement is such that the admission of pressure water into the line T with simultaneous connection of the line B to waste causes each valve to close, while admission of pressure water to the line B with connection of the line T to waste causes each valve to open.

All of the B and T lines running to the several hydraulic valve cylinders are connected into a pilot valve of the rotary disc type which, as shown in Figs. 2 to 7, has a port plate having a center port W connected with a waste line. The several B and T lines are connected into ports in the pilot valve port plate designated by reference numerals corresponding to those of the connections B and T running from the pilot valve to the several V valves. As shown the B ports are arranged on an outer circle of the port plate and the T ports on an inner circle of said plate, with each T port placed on a radius of the concentric circles about 36° behind that of the corresponding B ports. A pressure water line to the pilot valve enters the valve casing forming a chamber in which a rotor provided with a hard rubber or similar facing is seated upon the port plate, being held by a spring, as shown, and being rotated by means of a stem and hand wheel or gear. The rotor is formed with a recess R at its outer edge which admits pressure water to the B ports arranged on the outer circle and with an arcuate opening O running through the rotor and admitting pressure water into the T ports on the inner circle. The rotor also has a cavity or arcuate channel C so formed as to make connection between any of the B or T ports and the waste port W at the center of the port plate.

The arrangement of the pilot valve B and T ports in relation to the positions of the recess R, opening O and cavity C in the rotor allows for control of the operations of softening, draining, backwashing, brining and rinsing by turning the pilot valve rotor to five different angular positions which may be about 72° apart.

Figure 3:
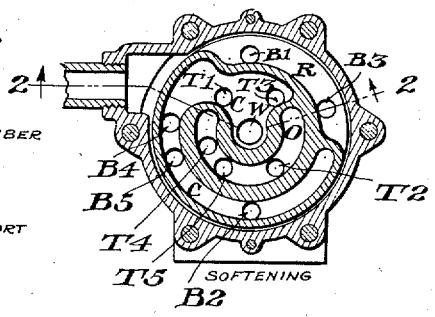

Referring to Fig. 3, showing the pilot valve in softening position, it is noted that ports B1 and B3 are supplied with pressure water through the rotor recess R, while ports T1 and T3 are connected to waste through rotor cavity C and the waste port. As a result, valves V1 and V3 are opened and water is softened by downward flow through the zeolite bed and discharged from the bottom of the softener into the service line. At the same time ports T2, T4 and T5 get pressure water through the rotor opening O and ports B2, B4 and B5 are connected to waste, and as a result valves V2, V2A, V4 and V5 remain closed.

Figure 4:
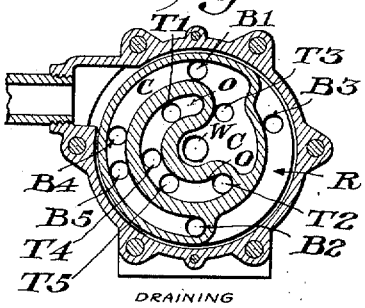
Figs. 4, 5, 6 and 7 show sections through the pilot valve of Fig. 1 in draining, backwashing, brining and rinsing positions, respectively.

By turning the rotor through 72° to the draining position shown in Fig. 4, the line B3 is supplied with pressure water and the valve V3 remains open while all the other V valve cylinders receive pressure through opening O and the T or top lines so that these other V valves are closed. This permits the clear untreated water in the softening tank above the zeolite bed to be drained from the softener through the bed, thereby being softened, and to flow together with the softened water contained in the bed to the service line through the open valve V3, this draining operation saving water.

Figure 5:
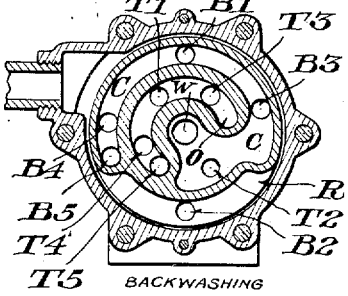

When the water level in the softening tank has been brought to the top of the zeolite bed, the pilot valve rotor is turned further through 72° to the backwash position of Fig. 5, supplying pressure water to port B2 through recess R and leaving all the other B ports connected to waste through the cavity C. Only valves V2 and V2A are opened, the B and T connections for both of these valves running to ports B2 and T2, respectively. The result is that backwash water is delivered to the bottom of the softener and runs to waste from the top trough through valve V2A, and the zeolite bed is backwashed.

Figure 6:
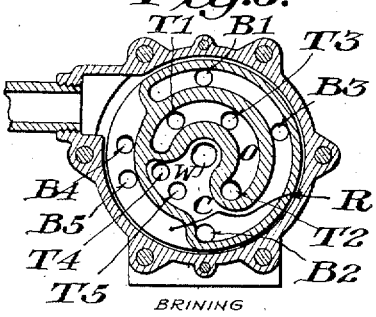

Upon turning the pilot valve 72° further to the brining position of Fig. 6, ports B4 and B5 obtain pressure water opening valves V4 and V5, while the other four V valves are closed. Raw water flows via line 5 through the brine injector, taking up brine which is carried into the top of the softening tank and the bottom of the softening tank is connected through valve V4 to waste. Brining of the zeolite is thus effected.

Figure 7:
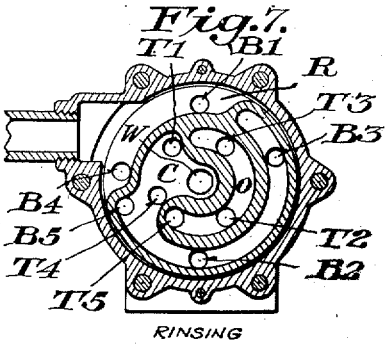

Turning the rotor again through 72° from the brining position to the rinsing position of Fig. 7, ports B1 and B4 receive pressure water opening valves V1 and V4, the other valves being closed, and as a result raw water enters the top of the softener via line 1 and the trough and the spent brine is rinsed from the zeolite bed and runs to waste from the bottom of the softening tank through valve V4.

A further turn of the pilot valve through 72° re-establishes the softening position of Fig. 3.

In Figs. 8 to 13 is shown a system of plural hydraulic cylinder valves with a central multiway pilot valve of the rotary disc type controlling an open upflow softener in the five consecutive operations of softening, brining, downflow rinsing, draining to bed and upflow rinsing. In this system, seven piston valves, V6 to 12 inclusive, have bottom and top connections to B and T ports in the pilot valve similar to those shown in the system of Figs. 1 to 7. The pilot valve also has a central waste port and a pressure inlet chamber above the rotor, as shown in section in Fig. 2.

Figure 9:
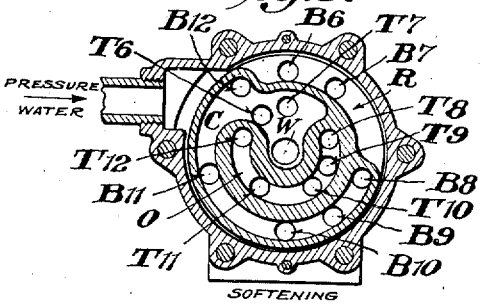
Figs. 9, 10, 11, 12 and 13 are sections through the pilot valve of Fig. 8 with the rotor in softening, brining, downflow rinsing, draining and upflow rinsing positions, respectively.

In the softening position of the pilot valve, as shown in Fig. 9, ports B6 and B7 receive pressure through the rotor recess R while the T ports connected to the other five valve cylinders receive pressure water through rotor opening O. Thus valves V6 and V7 are opened and the other valves closed, so that raw water enters the bottom of the softening tank through line K and softened water is discharged through the trough at the top of the softening tank and passes through the opened valve V7 in line 7 to service.

Figure 10:
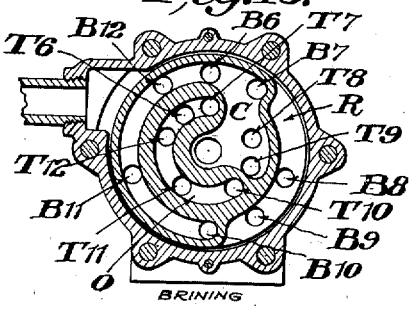

Turning the valve rotor through about one-fifth of a complete revolution, or 72° to the brining position shown in Fig. 10 supplies pressure water through rotor recess R to the B connections of valves V8 and V9, thus opening these valves; the T connections of the other five valves being connected to the pressure line by opening O with the corresponding B ports connected to the waste port of the pilot valve through cavity C, T ports 8 and 9 being also connected to waste. Thus valves V10, 11, 12, 6 and 7 are closed and, valves V8 and V9 being open, raw water flows from raw water line K through lines 10 and 8 to the brine injector and brine is drawn into the brine line running from the brine tank and delivered into the top of the softening tank through the brine distributor; the water in the softening tank being displaced through valve V9 to waste. The zeolite bed is thus treated with brine for regeneration.

Figure 11:
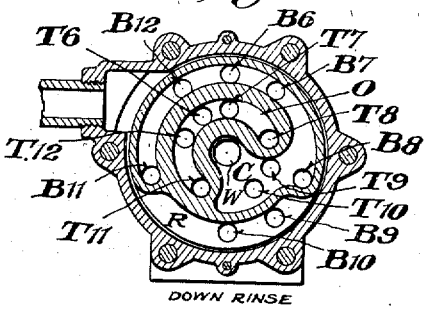

Further turning of the pilot valve to the downflow rinse position shown in Fig. 11 leaves the port B9 in communication with the pressure water line and also puts port B10 in communication with the pressure line of the pilot valve, with ports T9 and T10 connected to waste, leaving the other B ports connected to waste and T ports 11, 12, 6, 7 and 8 on pressure through the opening O. Thus valve V9 remains open and valve V10 is opened while the other V valves remain closed. This directs the flow of raw water through line 10 to the top of the softening tank and spent brine is rinsed downwardly from the zeolite bed, passing through valve V9 to waste.

Figure 12:
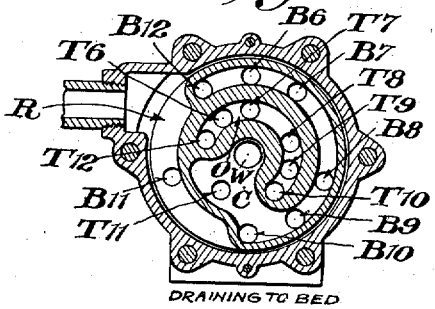

A further turn of the valve to the draining to bed position shown in Fig. 12 connects port B11 to pressure, thus opens valve V11 and closes all the other V valves. As a result the raw water in the top of the softening tank is drained out through line 11 to waste until the level of water in the softening tank is at or near the top of the zeolite bed.

Figure 13:
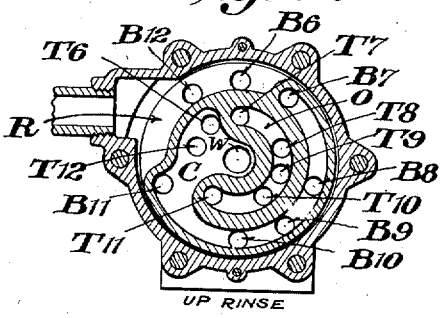

The zeolite bed is then given an upflow rinse by turning the pilot valve from the draining to bed position of Fig. 12 to the upflow rinse position of Fig. 13. This puts pressure on the B connections of valves V12 and V6, opening these valves so that water flows into the bottom of the softening tank and fills up the space above the zeolite bed, overflowing through the trough and into line 12 and through valve V12 to waste. The top portion of the softening tank is thus filled with softened water.

A further turn of the pilot valve to the position shown in Fig. 9 reestablishes the softening connections. Thus five turns of the valve through approximately fifths of a complete circle of 360° coordinate the opening and closing of the seven V valves to effect the five separate operations described.

For the operation of filtering apparatus, fewer connections are required than for water softening. A simple pilot valve for controlling the three operations of filtering, backwashing and filtering to waste in a downflow pressure filter equipped with pressure actuated valves is shown in Figs. 14, 15, 16 and 17. The pilot valve for this filter is quite similar to that shown in Figs. 1 to 7, but eliminaton of the brining and rinsing operations permits simplification of the pilot valve. Only three positions of the pilot valve are required and change from each position to the next involves turning the valve rotor through a third of a circle, or 120°. In this valve the B and T ports of each pair are located in the same angular position on the port plate.

In the filtering position of the pilot valve (Fig. 15) the position of the pilot rotor causes pressure water to be delivered to the bottom connections for opening valves V1 and V3. This valve operation causes flow of water downward under pressure through the filter and out from the bottom of the filter tank through valve V3 to service. In the second or backwash position (Fig. 16) line B2 receives pressure water and delivers it to both valves V2 and V2A to open them, effecting a backwash flow of raw water into the bottom of the filter tank and out of the top and to waste through valve V2A. In the third pilot valve position (Fig. 17) valves V1 and V4 are opened so that water is filtered to waste and clean filtered water is left in the bottom of the filter tank.

It is noted that both in the pilot valve of Figs. 1 to 7 and in that of Figs. 8 to 13 the T ports on the inner circle of the port plate and the corresponding paired B ports on the outer circle of the port plate are angularly spaced from each other, that is, each T port is on a radius of the concentric circles spaced about 36° behind its corresponding B port. With this angular radial spacing of the ports, as shown, the arcuate opening O in the valve rotor is so located and arranged that as the rotor is rotated (in a clockwise direction as shown) the arcuate opening engages each T port, at about the same time that the recess R of the rotor leaves the corresponding B port with engagement of the B port by the cavity channel C of the rotor. The arrangement is such as to leave a greater width with adequate flow capacity in the neck of the cavity channel C between the portion overlapping the T ports and the central waste port and that extending around the outer portion of the rotor engaging the B ports. The angular radial spacing of the paired B and T ports gives latitude in the design of other and modified valves, with location of the B and T ports in relation to the rotor passages so as to open and close any of the V valves at desired intervals with respect to the opening and closing of the other valves. The arrangement aids in coordinating the valve movements.

Figure 8:
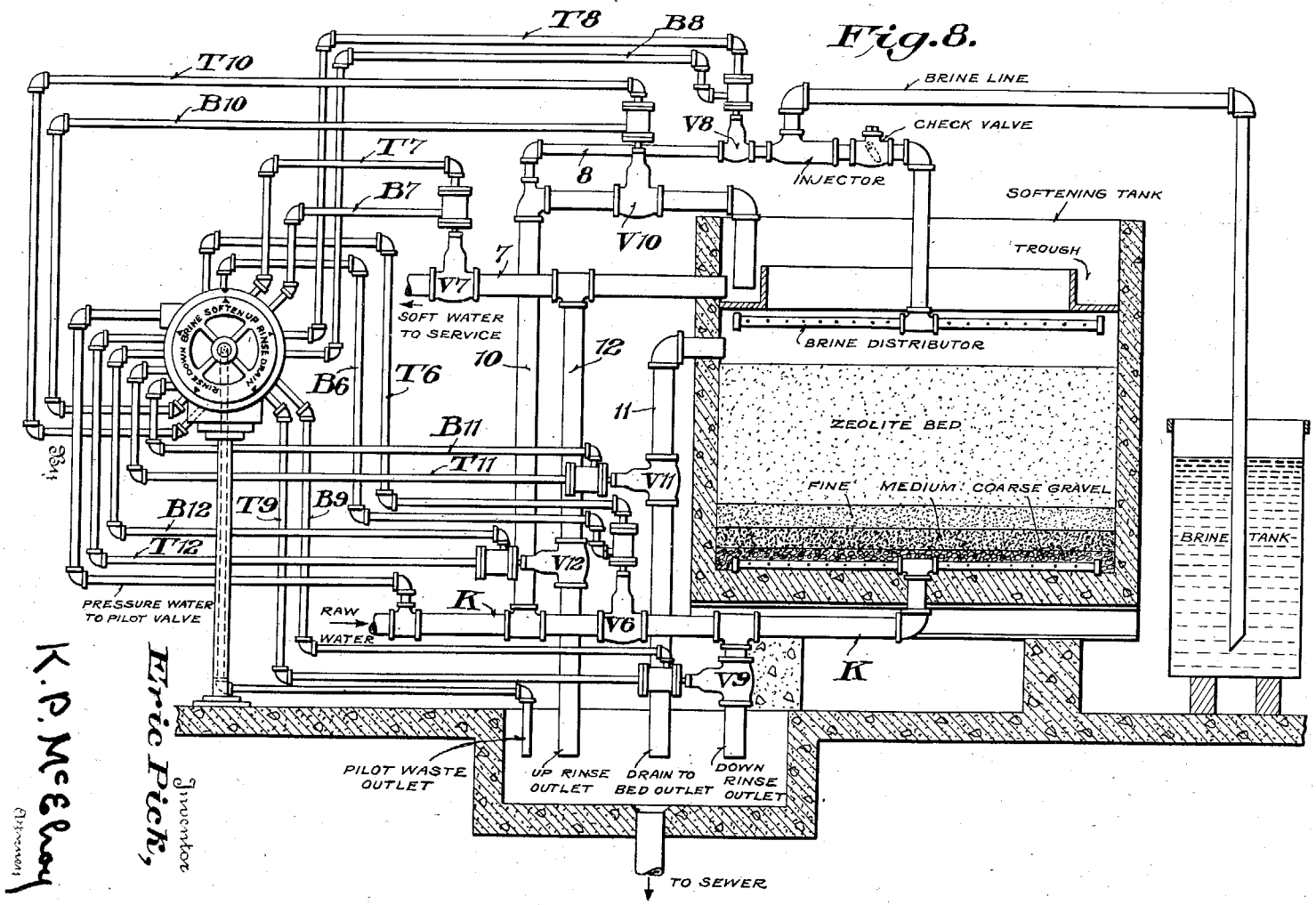
Fig. 8 is an elevational view with parts in section of an open upflow softener with a modified pilot valve.

In the layout of the pilot valve as shown in the various figures, when any B port is placed at a point corresponding to the center line of rotor recess R in any of its positions, then the V valve connected to such B port is open in only one position of the pilot valve. When it is desired that a V valve remain open in two consecutive operations, then the B port for this valve can be placed in the port plate half way between the center lines of the recess R in adjacent positions of the pilot valve. For example, valve V9 of Fig. 8 is open during the brining and the succeeding downflow rinse; port B9 (which controls the opening of valve V9) being located half way between the center lines of recess R in the brining and down rinse positions, respectively (Figs. 10 and 11) and receiving pressure fluid through recess R in both positions.

If it should be necessary in any case, a V valve can be kept open for three or four consecutive operations simply by reversing the B and T connections of the V valve in the pilot valve so that pressure fluid for opening the V valve is supplied through the arcuate opening in the pilot valve rotor instead of the recess. Valve V12, for example, shown in Figs. 8 to 13 as closed in four consecutive positions of the pilot valve, could be kept open in these four positions by reversing the port connections of pipes B12 and T12 so that bottom pressure for opening valve V12 would be supplied through rotor opening O in the pilot valve.

Figure 1:
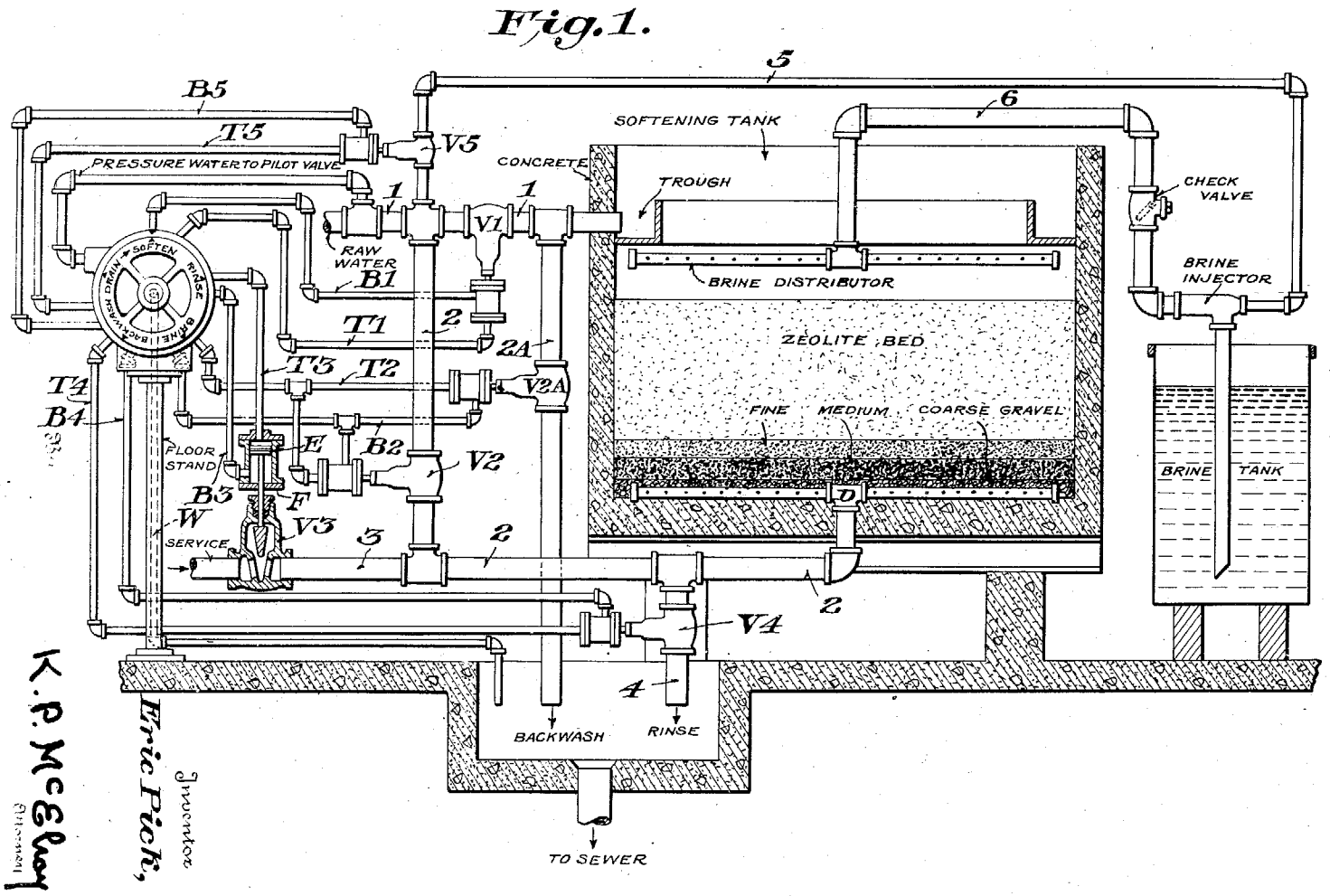
Figure 2:
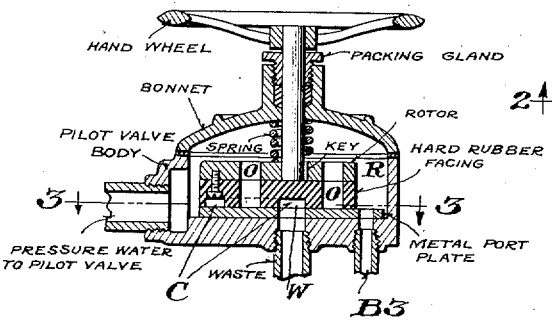
Figure 14:
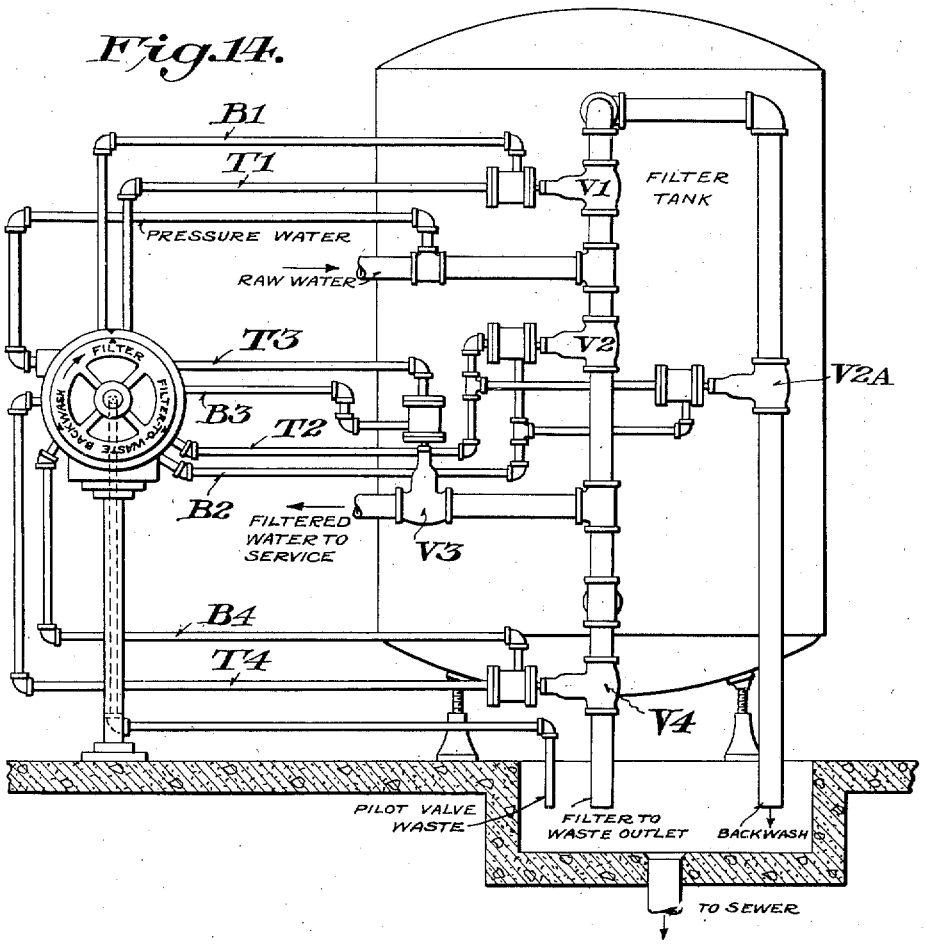
Fig. 14 is an elevational view of a downflow pressure filter.
Figure 15:
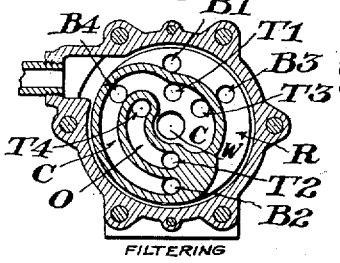
Figs. 15, 16 and 17 are sectional views of the pilot valve of Fig. 14 in positions for filtering, back-washing and filtering-to-waste, respectively.
Figure 16:
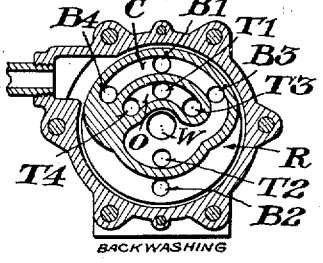
Figure 17:
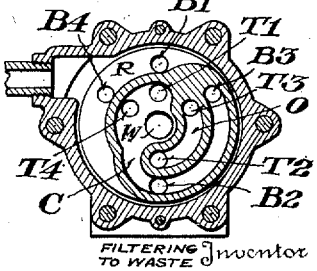

It may be noted that when the pilot valve for the filter of Fig 14 (or the pilot valve for the softener of Fig. 21 hereinafter described) is turned from the normal service (filtering or softening) position to the backwashing position, or when the pilot valve of Fig. 1 is turned from the drain position (Fig. 4) to the backwash position (Fig. 5), the service outlet valve V3 is connected for closing while at the same time the backwash inlet valve V2 is connected for opening. There may therefore be a time shortly after the pilot valve has been turned to the backwash position when both these valves V2 and V3 are partly open, valve V3 having started to close and valve V2 having started to open, and this establishes for a short period of time a short circuit from the raw water line directly to the service line. Such contamination of the service water is in some cases objectionable, and it can be prevented by any of the means shown in Figs. 18, 19 and 20, which prevent valve V2 from being opened before valve V3 is closed.

Figures 18, 19, 20:
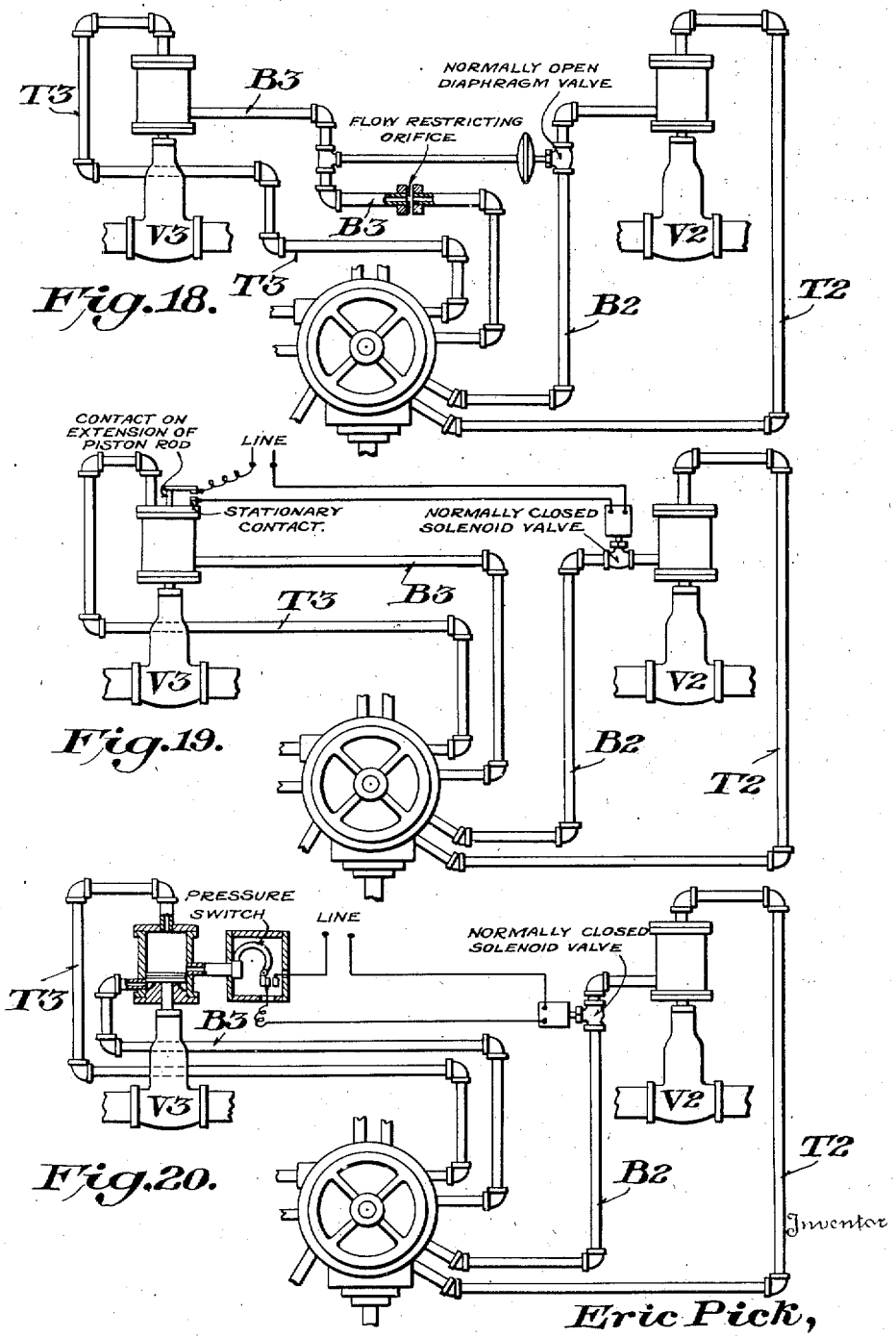
Figs. 18, 19 and 20 illustrate diagrammatically certain supplemental arrangements for the softeners of Figs. 1, 8 and 21 and the filter of Fig. 14 preventing the possibility of contamination of the treated water by raw water.

As shown in Fig. 18, a diaphragm valve is inserted in line B2 (but it could instead be inserted in line T2) and a flow restricting orifice is inserted in line B3, the casing of the normally opened diaphragm valve being connected to line B3 between the orifice and the hydraulic cylinder of valve V3. As the pilot valve is turned to the backwashing position from the filtering or softening position (or from the draining position of Fig. 1) the admission of pressure water into line T3 (in order to close valve V3), and thence into the restricted orifice in line B3 causes pressure to be communicated to the diaphragm valve casing in line B2 causing the diaphragm valve to close so that the piston of valve V2 cannot move and the valve remains closed until the piston of valve V3 has reached the end of its travel and valve V3 has closed, whereupon the pressure from the diaphragm casing is wasted through the flow restricting orifice in line B3, the diaphragm valve then opens and valve V2 is then able to open because of the admission of pressure water to the cylinder through line B2.

In the arrangement of Fig. 19 the principle is similar but here a normally closed solenoid valve is inserted in line B2. The piston rod of valve V3 is extended and carries a movable contact. When valve V3 has closed, this contact closes a circuit energizing the solenoid and thereby opening the solenoid valve which then permits valve V2 to open.

In the arrangement of Fig. 20 a pressure switch is connected to the cylinder of valve V3 in such manner that it receives pressure through connection T3 when the piston has reached the end of its travel and has closed valve V3. This admission of pressure closes the pressure switch energizing the normally closed solenoid valve in line B2 which opens and then permits the backwash inlet valve V2 to open.

Figure 21:
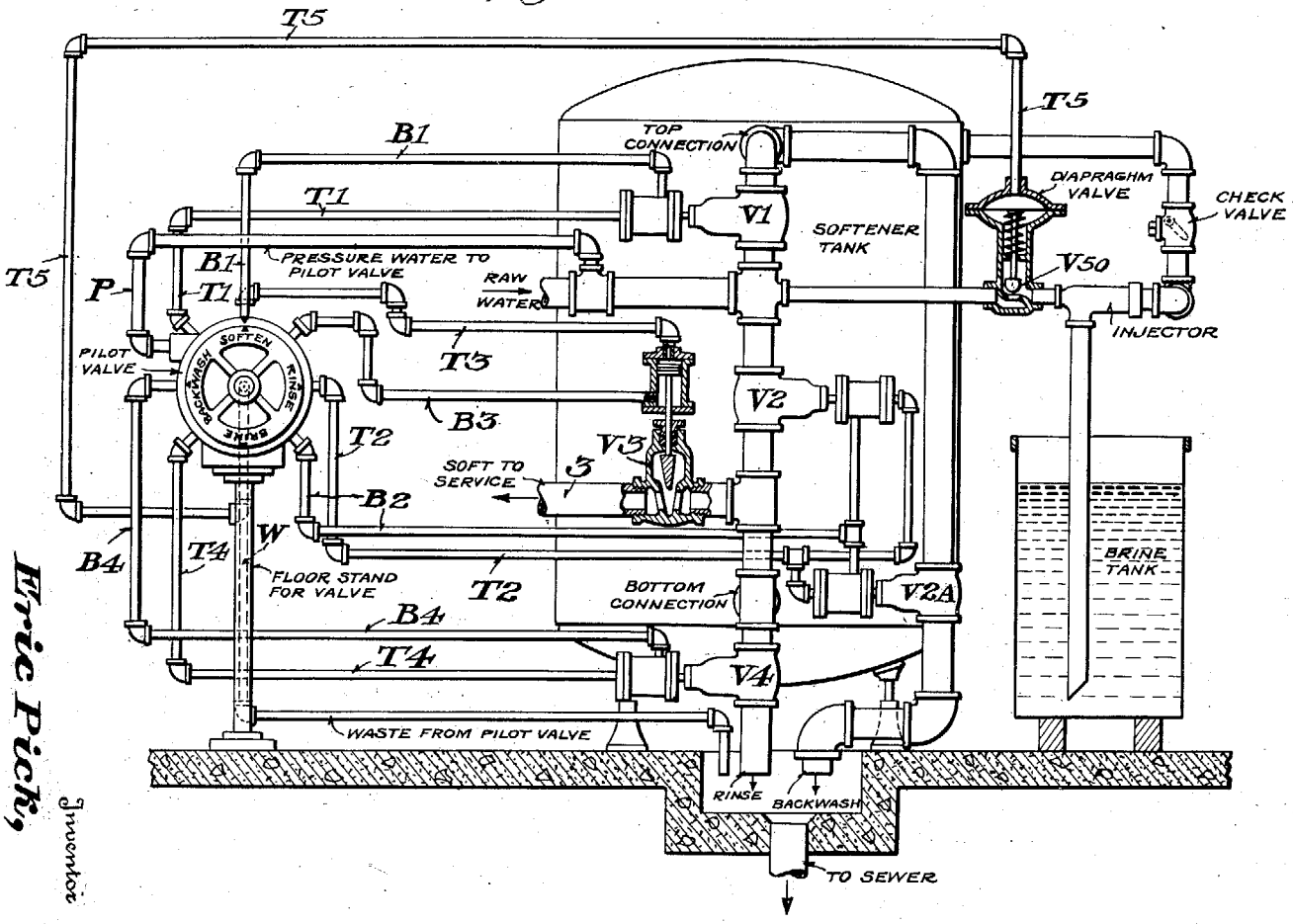
Fig. 21 is a diagrammatic elevational view with parts in section of a downflow pressure water softener with piston valves controlled by a rotary pilot valve.

In Fig. 21 is shown a valve system for a downflow pressure water softener under control of a pilot valve. A modification of the pilot valve of Figs. 2 to 7 may be used for this softener (without the draining position of Fig. 4). In Figs. 22 to 27*a* is illustrated a pilot valve of the rotary plug type for the softener of Fig. 21. In this valve the arrangement of the B ports and the T ports on two different circles in the valve body is effected by placing the B ports and the T ports on different planes in the valve. In principle the action of the rotary plug pilot valve in coordinating the operation of a plurality of valves by flow of a fluid under pressure is the same as that of the rotary disc valve.

As shown in the figures, a rotary plug multiway pilot valve comprises a circular casing with a conical or cylindrical plug disposed in the casing and rotatable therein. The casing is formed with B ports arranged in a circle on one plane and T ports in a circle on another plane. These B and T ports have connections to the bottoms and tops, respectively, of valve operating cylinder-pistons of a structure shown in the valve V3 of Fig. 21. In the pilot valve casing above the plug rotor is formed a chamber P with an inlet for water or other suitable fluid under pressure. The pilot valve casing is also formed with a chamber W below the plug rotor arranged with a central waste outlet. The plug rotor is held by the force of a spring held by a top closure on the valve casing through which the stem of the rotor passes, the stem being provided with a handwheel or gearing for either manual or motor operation. Pressure chamber P above the rotor plug communicates through a short longitudinal channel P1 in the rotor (Fig. 23) with a peripheral rotor channel P2 at the level of the B ports, from which another short longitudinal channel P3 communicates with a second peripheral channel P4 engaging the T ports. The waste outlet chamber W connected to the waste line communicates through a central longitudinal rotor channel W1 with a peripheral channel W2 at the level of the T ports and further through a central channel W3 with a peripheral channel W4 engaging the B ports. Thus the plug is adapted to establish communication between the top pressure chamber and the various B ports arranged in a set on a circle in the upper portion of the valve casing and also with the T ports in a second circular set in the lower portion of the valve casing. Rotation of the valve plug also establishes communication between the waste chamber at the bottom and the various T ports in the lower portion of the valve casing as well as the upper or B ports.

As shown, the arrangement of the casing ports and the peripheral plug passages is such as to control the opening and closing of the V valves for the operations of softening, backwashing, brining and rinsing in a pressure downflow water softener. In the softening position of the pilot valve plug rotor (Figs. 24 and 24*a*) pressure water flows from chamber P through rotor passages P1 and P2 to ports B1 and B3 and ports T1 and T3 on the lower plane are connected through plug passages W2 and W1 with the waste chamber W having connection with a drain. These simultaneous B and T connections supply fluid to the cylinders of valves V1 and V3 to open them and pass water downwardly through the softener tank, softened water passing to service from the bottom of the tank through valve V3. In this position of the pilot valve pressure water goes through rotor channels P1, P3 and P4 to the T ports for valves V2 (and V2A) V4 and V50 so that these valves remain closed.

Regeneration being required, the pilot valve is turned 90° to the backwashing position (Figs. 25 and 25*a*). In this position pressure water passes from chamber P through channels P1 and P2 to port B2 (running to waste from port T2 in channels W2 and W1). This opens valves V2 and V2A, sending backwash water into the bottom of the softener and out from the top to the sewer; valves V1, V3, V4 and V50 being closed by pressure water passing through channels P3 and P4 and ports T1, T3, T4 and T5.

After completion of backwashing, a turn of the pilot valve through 90° to the brining position (Figs. 26 and 26*a*) supplies pressure water through port B4 to open valve V4. In this position of the pilot valve, port T5 is connected to waste and the spring-diaphragm valve V50 is opened by its spring. This results in directing a flow of water to the injector and in passing brine downwardly through the softener bed, waste fluid passing through pilot valve ports T4 and T5 and plug passages W2 and W1 to the waste outlet; valves V1, V2 (and 2A) and V3 being closed by pressure admitted through peripheral plug passage P4 to ports T1, T2 and T3.

The arrangement as shown in Fig. 21 exemplifies use of the central rotary pilot valve in control of diaphragm valves. The arrangement is advantageous, particularly when the valve to be controlled is of relatively small size and light weight. A diaphragm valve can be substituted for any of the piston valves with appropriate omission of the B or T connections to the pilot valve.

After brining, a further turn of the pilot valve through 90° to the rinsing position (Figs. 27 and 27*a*) leaves port B4 under pressure (the location of port B4 being such as to engage channel P2 in both brining and rinsing positions) to keep waste valve V4 open and puts port B1 under pressure to open valve V1 admitting rinsing water to the top of the softener; ports T3, T2 and T5 being under pressure through peripheral plug passage P4 communicating through longitudinal passages P3 and P1 with the pressure chamber P.

A further turn of the pilot valve through 90° from the rinsing position reestablishes the softening position of the various valves. Thus by four quarter turns of the pilot valve the operation of the six V valves is coordinated to effect three regenerative operations and return to softening.

Control of the several V valves by the rotary pilot valve may be made completely automatic. For this the pilot valve is operated by an electric motor under control by electrical means. Various known valve control and timing systems may be adapted to plural valve control through the medium of a motor-operated central pilot valve. Advantageous combinations are afforded by the valve system of the present invention and the valve control means of Hughes Patent No. 2,012,194 and of Pick 1,937,325. In large scale work I have found the system described in the acknowledged Staegemann Patent No. 2,051,155 to be particularly advantageous for automatic control of large sized plural valves.

Fig. 28 shows a diagram of electrical timing control means for a water softener as described in the Staegemann patent with substitution of the multiway pilot valve of the present invention for the "control valve" and with modifications of the control means adapted to make pilot valve control of a plural valve water softener completely automatic. The pilot valve may be either of the rotary disc type (Figs. 1 to 7 and 8 to 13) or of the rotary plug type (Figs. 21 to 27*a*).

In Fig. 28 the pilot valve is shown as a rotary disc valve having four positions 90° apart and corresponding for example to softening, backwashing, brining and rinsing.

The water meter 33 is connected in the softened water service line as for example in line 3 of Fig. 21 and regeneration is started by the water meter closing switch 121 after passage of a predetermined amount of softened water through the meter; the valve operating motor 60 being started to rotate the pilot valve from the softening position to backwashing position. The timing of the periods of backwashing, brining and rinsing is effected by the automatic time switch 35, float switch 37 and time switch 35, respectively, the motor 60 being stopped automatically by the circuit breaker operatively connected to the pilot valve shaft after each valve actuation and being started for each actuation by the automatic time switch or the float switch as described in the Staegemann patent. Complete automatic control of a system of heavy plural valves is thus secured.

What I claim is:

1. A valve system for automatically coordinating a plurality of fluid flows which comprises, in combination, a plurality of valves operated by pressure cylinders and pistons, a rotary multiway pilot valve provided with a pressure fluid inlet and an exhaust fluid outlet and having a plurality of pairs of ports with pipes connecting each pair of ports to opposite ends of one of the operating valve cylinders and a rotatable valve member having two systems of passages formed therein adapted upon rotation of said valve member to connect one of each of said pairs of ports with the pressure fluid inlet and the other of each pair of ports with the waste outlet, an electric motor for rotating the pilot valve, a circuit breaking device actuated by said motor and adapted to deenergize said motor, and circuit closing means in series therewith adapted to energize said motor.

2. In a valve system for coordinating a plurality of fluid flows which comprises a plurality of main valves operated by a fluid under pressure, pilot valve means controlling the pressure fluid and pressure fluid connections between the main valves and the pilot valve means, means for preventing the opening of one of said main valves until a second of said main valves is closed, said last named means comprising an auxiliary valve in a pressure fluid connection to said one main valve, and means for opening said auxiliary valve automatically actuated by the closing of said second main valve.

3. A combination according to claim 2, the means for opening the auxiliary valve being actuated by a change in pressure of the pressure fluid operating the second main valve.

4. A combination according to claim 2, the means for opening the auxiliary valve being actuated by the mechanical movement of the second main valve.

ERIC PICK.

REFERENCES CITED

The following references are of record in the file of this patent:

UNITED STATES PATENTS

| Number | Name | Date |
|---|---|---|
| 395,625 | Moore | Jan. 1, 1889 |
| 617,633 | Brinkman | Jan. 10, 1899 |
| 904,179 | Chase | Nov. 17, 1908 |
| 1,467,059 | Moses | Sept. 4, 1923 |
| 1,683,762 | D'Ardenne | Sept. 11, 1928 |
| 1,976,417 | Steinberg | Oct. 9, 1934 |

FOREIGN PATENTS

| Number | Country | Date |
|---|---|---|
| 22,961 | Great Britain | Oct. 28, 1908 |